(12) United States Patent
Fabre et al.

(10) Patent No.: US 9,334,895 B2
(45) Date of Patent: May 10, 2016

(54) TAPPED INSERT FOR CYLINDRICAL BORE AND INSTALLATION EQUIPMENT FOR SUCH INSERT

(75) Inventors: Christian Fabre, Tournefeuille (FR); Alain Bignolais, Leguevin (FR)

(73) Assignee: AIRBUS OPERATIONS S.A.S., Toulouse (FR)

(*) Notice: Subject to any disclaimer, the term of this patent is extended or adjusted under 35 U.S.C. 154(b) by 738 days.

(21) Appl. No.: 13/382,243

(22) PCT Filed: Jul. 6, 2010

(86) PCT No.: PCT/EP2010/004074
§ 371 (c)(1),
(2), (4) Date: Mar. 6, 2012

(87) PCT Pub. No.: WO2011/003571
PCT Pub. Date: Jan. 13, 2011

(65) Prior Publication Data
US 2012/0151733 A1  Jun. 21, 2012

(30) Foreign Application Priority Data

Jul. 6, 2009 (FR) .................................... 09 54662

(51) Int. Cl.
*F16B 37/12* (2006.01)
*F16B 13/06* (2006.01)

(52) U.S. Cl.
CPC .............. *F16B 37/122* (2013.01); *F16B 13/063* (2013.01); *Y10T 29/49815* (2015.01); *Y10T 29/49826* (2015.01); *Y10T 403/7064* (2015.01); *Y10T 403/7069* (2015.01)

(58) Field of Classification Search
CPC ........ F16B 37/122; F16B 5/02; F16B 13/068; F16B 13/066; F16B 5/0216; Y10T 29/53; Y10T 29/53126; Y10T 29/53291
USPC ............ 411/32, 44, 49, 55, 57.1, 58, 63, 80.5
See application file for complete search history.

(56) References Cited

U.S. PATENT DOCUMENTS

| 3,373,648 | A | 3/1968 | Pitzer |
| 3,961,410 | A | 6/1976 | Reed |
| 4,033,222 | A * | 7/1977 | Wilson ............................. 411/33 |
| 4,627,140 | A | 12/1986 | Davis |
| 6,039,497 | A | 3/2000 | Gullberg |
| 6,224,309 | B1 * | 5/2001 | Yamamoto ....................... 411/11 |
| 7,357,613 | B2 * | 4/2008 | Houck et al. ................. 411/60.3 |

(Continued)

FOREIGN PATENT DOCUMENTS

| DE | 197 13 541 A1 | 10/1998 |
| EP | 0 477 707 | 4/1992 |

(Continued)

OTHER PUBLICATIONS

Office Action issued Nov. 13, 2013 in Russian Application No. 2012103899 (With English Translation).

(Continued)

*Primary Examiner* — Christopher Besler
(74) *Attorney, Agent, or Firm* — Oblon, McClelland, Maier & Neustadt, L.L.P.

(57) ABSTRACT

The present invention relates to a tapped insert for cylindrical plain bore (30) of a part A1 comprising a cylindrical body (10), characterized in that said cylindrical body (10) comprises an inner bore (11) of frusto-conical shape, and at least one longitudinal slot (12, 12') extending into the cylindrical body (10) and communicating with said frusto-conical inner bore (11) and characterized in that the tapped insert also comprises a core (20) of frusto-conical shape complementary with said frusto-conical inner bore (11) of the cylindrical body (10), said core (20) comprising a inner tapped aperture (21), said cylindrical body (10) and said core (20) being such that said tapped insert can be holded in position and locked in said cylindrical bore (30) to equip said cylindrical bore with an inner taping.

9 Claims, 5 Drawing Sheets

(56) References Cited

U.S. PATENT DOCUMENTS

2001/0022924 A1* 9/2001 Wieser .................. 411/60.1
2002/0159829 A1 10/2002 Kruger et al.
2008/0038079 A1* 2/2008 Bobon .................. 411/57.1

FOREIGN PATENT DOCUMENTS

EP  0 824 202   2/1998
EP  1 467 106   10/2004
WO  01 57406    8/2001

OTHER PUBLICATIONS

International Search Report Issued Jan. 31, 2011 in PCT/EP10/04074 Filed Jul. 6, 2010.

U.S. Appl. No. 13/382,234, filed Feb. 2, 2012, Fabre, et al.

* cited by examiner

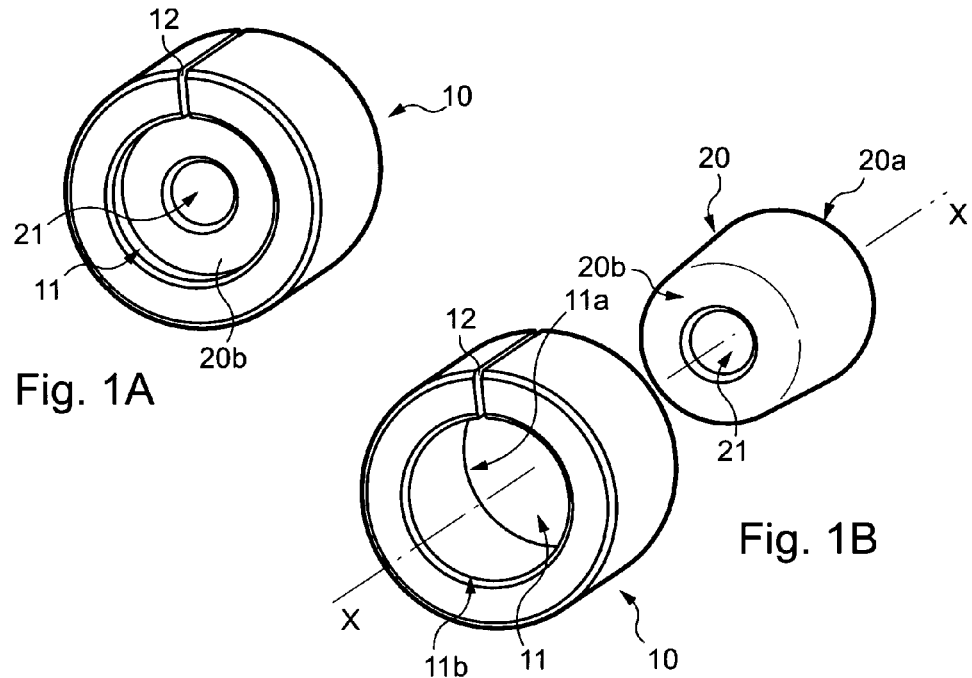
Fig. 1A
Fig. 1B
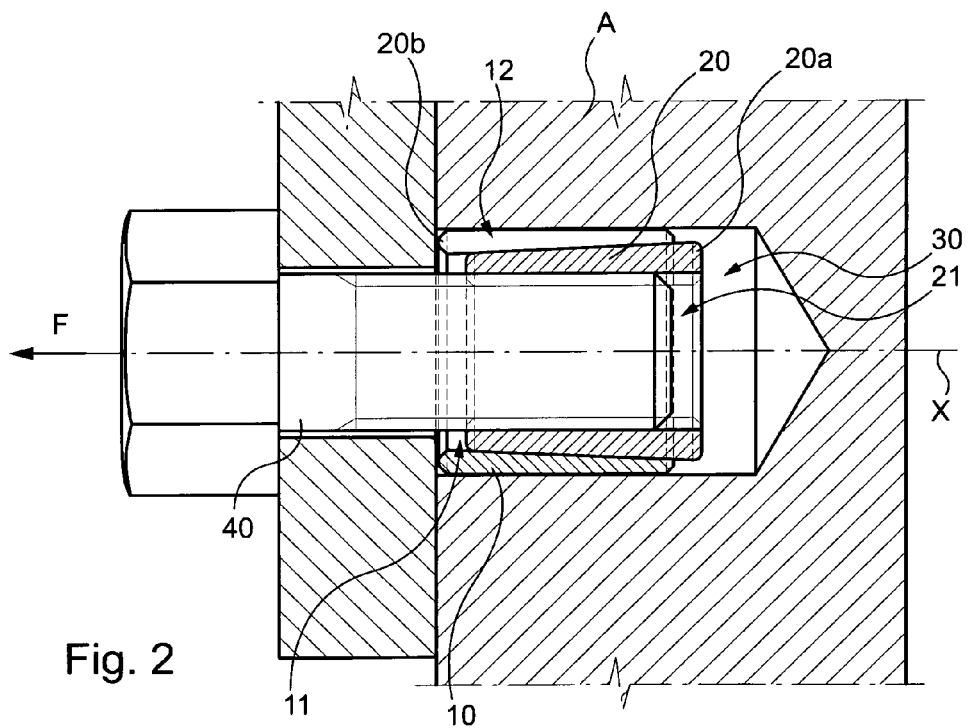
Fig. 2

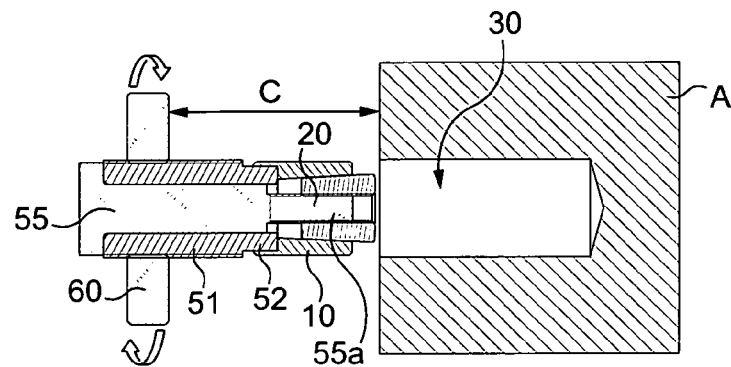
Fig. 7A
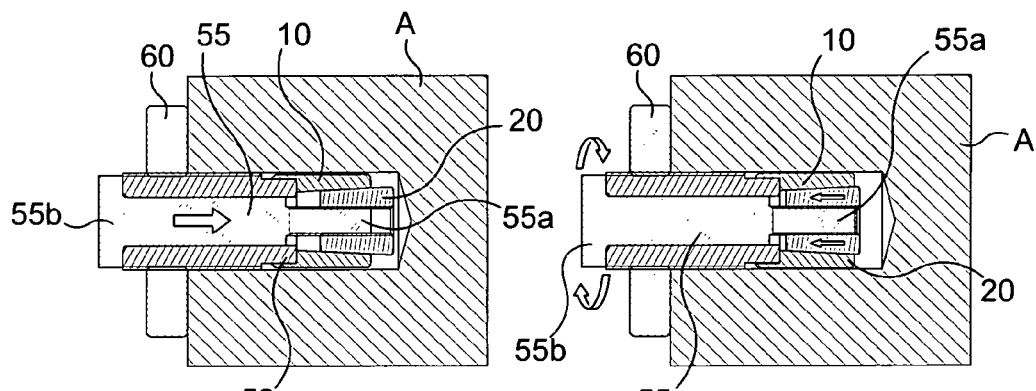
Fig. 7B
Fig. 7C
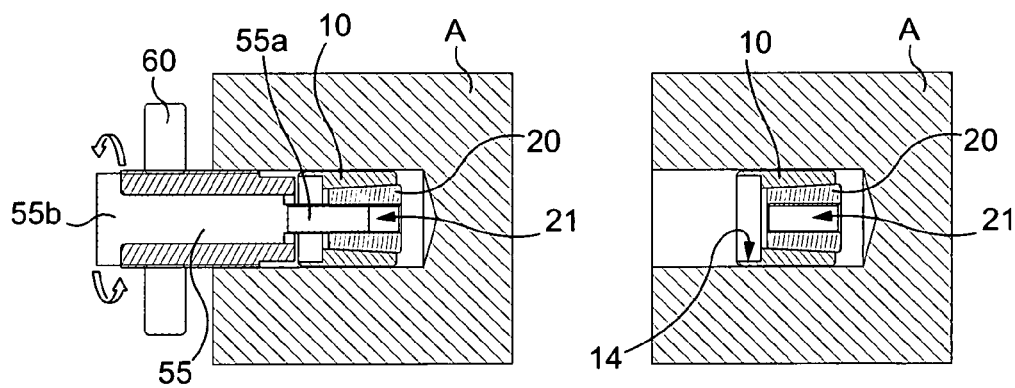
Fig. 7D
Fig. 7E

TAPPED INSERT FOR CYLINDRICAL BORE AND INSTALLATION EQUIPMENT FOR SUCH INSERT

The present invention relates to a tapped insert for cylindrical bore.

It also concerns installation equipment for such tapped insert.

Generally, the present invention is applicable to the mechanical linking domain of screw-nut type and more especially concerns the making of the female thread part of the mechanical link by means of a tapped insert.

The simplification of the machining in a part of a cylindrical bore intended to accommodate an attaching screw is known by using a tapped insert to ensure the function of the nut of an attachment system, by screwing. The cylindrical bore can thus be limited to a simple drilling operation.

Such tapped insert is especially used in a non-exhaustive manner to make mechanical screw-nut links in blind bores or, again, where overall size, material or, again, sealing problems exist allowing access via only one side of the part.

Various types of tapped inserts are known to ensure the internal tapping function in a plain bore.

For example, the use of a cylindrical insert with a knurled outside surface and a tapped inside surface corresponding to the thread of an attachment screw is known.

However, after insertion of an insert in a bore, the removal of said insert is generally impossible without destroying the insert or damaging the bore.

It is an object of the present invention to solve the above-mentioned disadvantages and to propose a tapped insert for cylindrical bore, simple to install and replace, without damaging the cylindrical bore or the tapped insert.

For this purpose, the present invention relates according to a first aspect to a tapped insert for cylindrical plain bore of a part comprising a cylindrical body.

According to the invention, the cylindrical body comprises an inner bore of frusto-conical shape and at least one longitudinal slot extending in the cylindrical body and communicating with said frusto-conical inner bore, said tapped insert also comprising a core having a frusto-conical shape complementary to said frusto-conical inner bore of the cylindrical body, said core comprising an inner tapped aperture, said cylindrical body and said core being such that said tapped insert can be held in position and locked in said cylindrical bore to equip said cylindrical bore with an inner taping.

Thus, thanks to the core of frusto-conical shape inserted into a complementary bore of the slotted cylindrical body, it is possible to obtain by displacement of the core in the frusto-conical inner bore a controlled deformation of the slotted cylindrical body in its diameter thus holding the tapped insert in position in a cylindrical bore.

By modifying the position of the core of frusto-conical shape in the frusto-conical inner bore of the cylindrical body, the anchoring force of the tapped insert in the cylindrical bore can be adjusted in such a way that the maximum allowable axial force during the screwing of a screw into the tapped insert can also be adjusted.

Moreover, the anchoring by positioning of the core of frusto-conical shape in the frusto-conical inner bore of the cylindrical body is reversible so that the replacement of the tapped insert can be easily obtained without its destruction or damage to the cylindrical bore.

The value of the half-angle of the core of frusto-conical shape and of the frusto-conical inner bore and the friction coefficient between the cylindrical bore to be equipped in said part and the cylindrical body are chosen to guarantee locking of said tapped insert.

In one embodiment, the half-angle value of the core of frusto-conical shape is comprised between 2.5° and 5°.

Preferentially, the diameter of the large base of said core of frusto-conical shape is substantially greater than or equal to the diameter of the large base of the frusto-conical inner bore of said cylindrical body.

During the displacement of the core of frusto-conical shape in the frusto-conical inner bore of the cylindrical body, the deformation of the cylindrical body is especially obtained by deforming the cylindrical body by diametral expansion.

To ensure a high expansion of the tapped insert if necessary, the cylindrical body comprises preferentially several slots extending over a part of the length of the cylindrical body and communicating with the frusto-conical inner bore.

According to an advantageous embodiment of the invention, said cylindrical body comprises a collar protruding from the outer wall of said cylindrical body, extending in the plane of a proximal face of said tapped insert, opposite to the large base of said frusto-conical inner bore of the cylindrical body.

The protruding collar ensures the longitudinal positioning of the insert in the cylindrical bore by the collar coming into contact with a face of a part with which the cylindrical bore to be equipped communicates.

According to one embodiment, the surface of the outer wall of said cylindrical body is structured, and preferentially knurled or striated.

According to another embodiment of the invention, said cylindrical body also comprises a tapped inner wall portion at one end of said frusto-conical inner bore, opposite the large base of said frusto-conical inner bore.

The present invention also relates according to a second aspect to tapped insert installation and removal equipment for a cylindrical bore.

This installation and removal equipment comprises at least one tapped insert according to the first aspect of the invention, the cylindrical body also comprising a tapped inner wall portion at one end of the frusto-conical inner bore, opposite the large base of the frusto-conical inner bore, and a tapped insert installation and removal tool.

This installation and removal tool comprises:
  a cylindrical body comprising a threaded end section, the thread of said end portion being adapted to the tapping of said tapped inner wall portion of the cylindrical body of said tapped insert, said cylindrical body of the tool comprising an inner tapping, and
  a screw of diameter substantially lower than the diameter of said inner bore of the cylindrical body of the tool, said screw comprising at one end a complementary thread of the inner tapped aperture of the core of said tapped insert.

The threaded end portion of the tool thus allows the cylindrical body of the tapped insert to be held fixed in a determined position when the screw is screwed into the inner tapped aperture of the core thus enabling the longitudinal displacement of the core in the cylindrical body and the expansion of the latter in the bore to be equipped.

Preferentially, the installation and removal tool also comprises a positioning ring installed to slide on said cylindrical body of said tool, said cylindrical body and said positioning ring comprising complementary sliding means adapted to hold said positioning ring on said cylindrical body in a defined longitudinal transverse section.

This positioning ring thus allows the depth at which the tapped insert is positioned by the installation and removal tool to be defined in the cylindrical bore to be equipped.

The insert can thus be positioned in an accurate and reproducible way in the cylindrical bore at a given depth.

The present invention also concerns a method for installing a tapped insert in a cylindrical bore of a part with said tapped insert installation and removal equipment, comprising the following steps:
  screwing said end portion into said tapped inner wall portion of said cylindrical body;
  inserting and partially screwing said screw into the tapped aperture of the core placed in said cylindrical body;
  adjusting the depth by which said tapped insert will be inserted into said part;
  screwing said screw into said tapped insert until obtaining the required anchoring force;
  removing said screw and said body.

The depth by which the tapped insert will be inserted in a cylindrical bore of said part is adjusted by moving a positioning ring on the cylindrical body of said equipment, said positioning ring coming into contact with a front face of said part when said tapped insert is inserted.

The present invention also concerns a method for removing a tapped insert in a cylindrical bore of a part with said tapped insert installation and removal equipment comprising the following steps:
  screwing said end portion into said tapped inner wall portion of said cylindrical body;
  moving a positioning ring along said cylindrical body of said equipment to come into contact with a front face of said part;
  inserting screw into the tapped inner bore of the core;
  screwing the screw until leaving a clearance between the head of the screw and the cylindrical body of the equipment;
  making a light impact against the screw;
  removing the tapped insert with the equipment.

Other features and advantages of the invention will become apparent on reading the following description.

On the accompanying drawings, given as non-limitative examples:

FIG. 1A is a perspective view of a tapped insert according to a first embodiment of the invention;

FIG. 1B is an exploded perspective view of the tapped insert of FIG. 1A;

FIG. 2 is a longitudinal cross-sectional view illustrating the installation of a tapped insert in a cylindrical bore according to the first embodiment of the invention;

Figure 6:
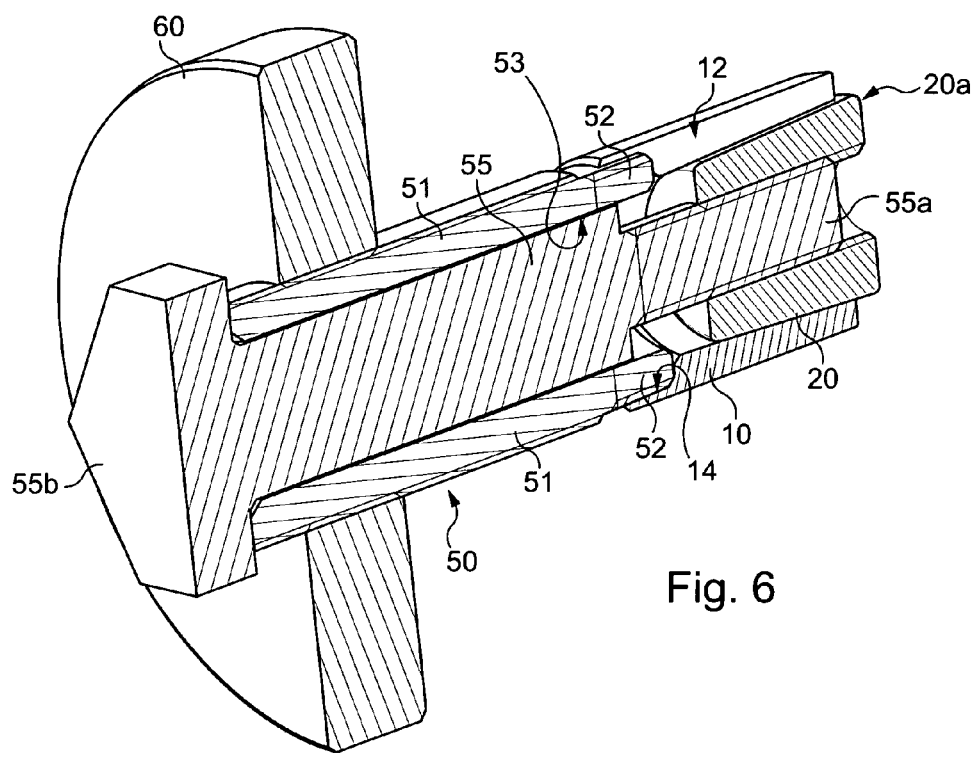
FIG. 6 is a longitudinal cross-sectional view of an installation and removal tool for the tapped insert of FIG. 5.

FIGS. 7A to 7E schematically illustrate the installation on a tapped insert with the tool of FIG. 6, and FIGS. 8A to 8E illustrate the removal of an insert with the tool of FIG. 6.

A description will first of all be given in reference to FIGS. 1A and 1B of a first embodiment of a tapped insert according to the invention.

This tapped insert comprises a cylindrical body 10 with a shape adapted to a cylindrical bore to be equipped.

In practice, the diameter of the cylindrical body 10 is determined so that it is somewhat smaller than the diameter of the cylindrical bore to be equipped.

Moreover, the length of the cylindrical body 10 of the tapped insert is substantially equal to the diameter of the cylindrical bore to be equipped.

As clearly illustrated on FIG. 1B, said cylindrical body 10 includes an inner bore 11 of frusto-conical shape.

As a non-limitative example, the half-angle of the cone defining the frusto-conical shape of the inner bore 11 is approximately equal to 2.5°.

The value of the half-angle of the cone can also be greater than 2.5° whilst preferentially remaining lower than 5°.

The cylindrical body 10 also comprises at least one longitudinal slot, here a single slot 12 extending in the length of the cylindrical body 10 and communicating with the frusto-conical inner bore 11.

Preferentially, the width of this longitudinal slot 12 is as low as possible, determined by the manufacturing constraints of the slotted cylindrical body 10.

Thus, this longitudinal slot 12 extends along a generatrix of the cylindrical body 10, with central longitudinal axis X.

The tapped insert also comprises a core 20 of frusto-conical shape complementary to the frusto-conical inner bore 11 of the cylindrical body 12.

Thus, the core of frusto-conical shape 20 has a frustum of a cone shape with same half-angle as that of the frusto-conical inner bore 11 of the cylindrical body 10, between 2.5° and 5° and, here, approximately equal to 2.5°.

The length of the core of frusto-conical shape 20 is substantially equal to the length of the cylindrical body 10 in the longitudinal direction.

Moreover, the diameter of the large base 20a of the core of frusto-conical shape 20 is substantially greater than or equal to the diameter of the large base 11a of the frusto-conical inner bore 11 of the cylindrical body 10.

Thus, the core of frusto-conical shape 20 can be inserted into the frusto-conical inner bore 11 of the cylindrical body 10 and come into contact by its large base 20a with the large base 11a of the frusto-conical inner bore 11.

Moreover, the core of frusto-conical shape 20 includes an inner tapped aperture 21.

This inner tapped aperture 21 is of cylindrical shape and extends in the longitudinal direction of the core of frusto-conical shape 20, of same central longitudinal axis X, when the core of frusto-conical shape 20 is inserted into the cylindrical body 10.

Preferentially, as illustrated in this embodiment, the inner tapped aperture 21 communicates on each side with the core of frusto-conical shape 20.

Moreover, the diameter of the small base 11b of the frusto-conical inner bore 11 of the cylindrical body 10 is slightly greater than the diameter of the inner tapped aperture 21 of the core of frusto-conical shape 20.

A description will now be given in reference to FIG. 2 of the installation of such tapped insert in a cylindrical bore.

In the embodiment illustrated on FIG. 2, a cylindrical bore 30 is thus provided in a part A.

The assembly of the tapped insert is performed as follows.

The core of frusto-conical shape 20 is placed in the slotted cylindrical body 10, the two elements being in perfect geometrical adequation on account of the complementary frusto-conical shapes.

The installation of the tapped insert is done by simply positioning said insert in the bore 30 of part A, the diameter of which is very slightly higher than the diameter of the cylindrical body 10.

It is to be noted concerning this that the cylindrical bore 30 can be communicating or not.

In the embodiment illustrated on FIG. 2, the cylindrical bore 30 is blind.

The insert of frusto-conical shape 20 is inserted into the frusto-conical inner bore 11 via the large base 11a of said frusto-conical inner bore 11 in such a way that the small base 20a of the core of frusto-conical shape 20 is moved in direction of the small base 11b of the frusto-conical inner bore 11 along the central longitudinal axis X of the tapped insert, also corresponding to the central longitudinal axis X of the cylindrical bore 30 to be equipped.

Moreover, concerning the installation direction, the tapped insert is inserted into the cylindrical bore 30 in such a way that the large base 20a of the core of frusto-conical shape 20 comprises a terminal end of the tapped insert thus positioned.

Thanks to the inner tapped aperture 21 of the core of frusto-conical shape 20, a traction force can be exerted on this core of frusto-conical shape 20 by means of an installation screw 40 the thread 41 of which is adapted to the tapping of the inner tapped aperture 21 during the rotation of the installation screw 40.

Thus, with the cylindrical body 10 held in position in the cylindrical bore 30, the traction force exerted by the installation screw 40 on the core of frusto-conical shape 20 causes the translation movement of the core of frusto-conical shape 20 in the frusto-conical inner bore 11 of the slotted cylindrical body 10.

Once contact has been made between the core of frusto-conical shape 20 and the frusto-conical inner bore 11, the traction force in the direction of arrow F exerted on the core of frusto-conical shape 20 causes an increase in the contact pressure between the core of frusto-conical shape 20 and the cylindrical body 10 which leads to the deformation of said cylindrical body 10.

This deformation is reflected by an expansion of the diameter of the cylindrical body 10 thanks to the presence of the longitudinal slot 12.

This diametral expansion of the cylindrical body 10 will fill the small clearance existing between the initial diameter of the cylindrical body 10 and the diameter of the cylindrical bore 30 to be equipped.

Thus, the elimination of this clearance leads to the locking of the tapped insert in the cylindrical bore 30.

It is to be noted that the lower the difference in diameter between the cylindrical bore 30 and the cylindrical body 10, the more the deformation of the slotted cylindrical body 10 can be limited.

Moreover, once the cylindrical body 10 is in contact with the cylindrical bore 30 of part A, an additional locking force may be required to ensure the correct anchoring of the tapped insert in the cylindrical bore 30.

Concerning this, it is to be noted that a direct relation exists between the traction force exerted by the installation screw 40 and the maximum axial force to which the tapped insert can be submitted once positioned.

The tightening torque exerted on the installation screw 40 can thus be measured, for example by a torque wrench, to adjust the maximum axial force liable to be supported by the tapped insert.

It is to be noted that a direct relation exists between the traction force exerted by the installation screw 40 and the contact pressure between the core of frusto-conical shape 20 and the cylindrical body 10.

Thus, the maximum axial traction force that the tapped insert can support varies according to the value of the half-angle of the core of frusto-conical shape 20 and of the frusto-conical inner bore 11 and the friction coefficient between the cylindrical bore 30 to be equipped in part A and the cylindrical body 10 (depending on the materials used for the part A and the cylindrical body 10).

For a half-angle value of the core of frusto-conical shape of comprised between 2.5° and 5°, all materials, metallic or non-metallic, can be used to make the tapped insert and guarantee locking of the tapped insert in the cylindrical bore 30 to be equipped.

Once the tapped insert is locked in the cylindrical bore 30, the installation screw 40 can be removed to leave the tapped insert in position for its later use.

This tapped insert thus allows a plain cylindrical bore to be equipped with an inner tapping.

Figure 3:
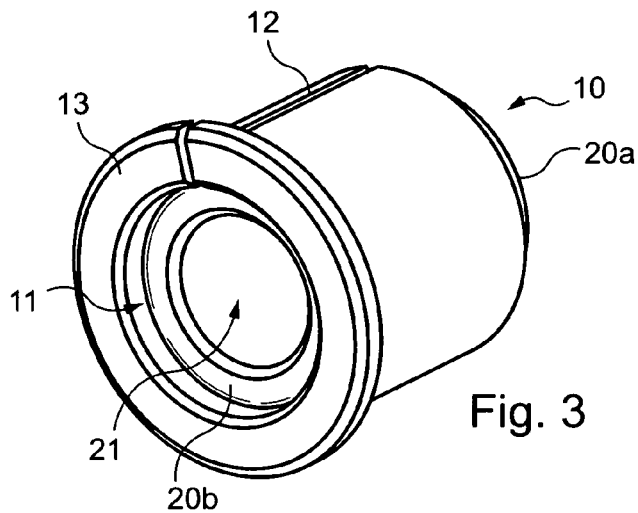
FIG. 3 is a perspective view of a tapped insert according to a second embodiment of the invention.

Now, a tapped insert in accordance with a second embodiment of the invention will be described in reference to FIG. 3.

This tapped insert is from all points of view identical to the one described previously in reference to FIGS. 1A and 1B, the common elements having the same references.

However, this tapped insert also comprises, on the cylindrical body 10, a collar 13 protruding from the outer wall 10' of the cylindrical body 10.

Here, this collar 13 has a annular shape concentric with the cylindrical body 10, with same central longitudinal axis X.

This collar 13 extends protruding in the plane of the proximal face of the tapped insert, opposite the large base 11a of the frusto-conical inner bore 11 of the cylindrical body 10.

Thus, this collar 13 extends in the plane into which the small base 11b of the frusto-conical inner bore 11 of the cylindrical body 10 extends.

The collar 13 thus enables positioning in abutment for the installation of the insert in a cylindrical bore.

In practice, the cylindrical bore communicating with a front face of a part, the collar 13 of the tapped insert comes into abutment with this front face when the cylindrical body 10 is inserted into the cylindrical bore to be equipped.

This collar 13 thus allows the tapped insert to be perfectly positioned in the cylindrical bore 30 and also the cylindrical body to be held in position during the traction force exerted by an installation screw on the core of frusto-conical shape 20.

Of course, the collar 13 can have a shape different from an annular shape and, for example, be limited to one or more separate portions, forming flanges protruding from the outer wall 10' of the cylindrical body 10.

Figure 4:
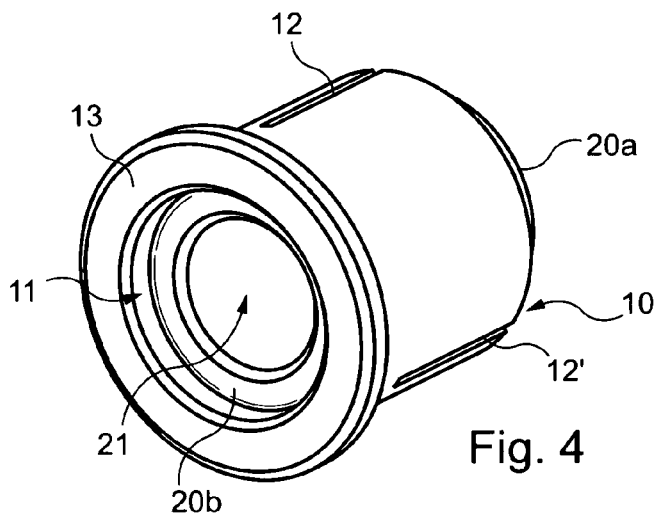
FIG. 4 is a perspective view of a tapped insert according to a third embodiment of the invention.

FIG. 4 illustrates a third embodiment substantially identical to the one described previously in reference to FIG. 3.

In this third embodiment, the cylindrical body 10 comprises several longitudinal slots 12, 12'.

Preferentially, when the cylindrical body comprises several longitudinal slots 12, these are equally distributed angularly on the outer wall 10' of the cylindrical body to obtain a uniform deformation of the cylindrical body 10 during the expansion of its diameter in the cylindrical bore to be equipped.

The presence of several longitudinal slots 12, 12' in the cylindrical body 10 also allows the expansion capability of the cylindrical body in the cylindrical bore to be increased.

Now, a fourth embodiment of the tapped insert according to the invention will be described in reference to FIG. 5.

This fourth embodiment of the invention is substantially identical to the one described previously in reference to FIGS. 1A and 1B, the common elements having the same numerical references.

Here, to improve the anchoring of the tapped insert in the cylindrical bore, especially when the part comprising the cylindrical bore is made from a soft material, the cylindrical body 10 comprises an outer wall 10' with a structured surface and, for example, knurled or striated.

Unlike a plain surface, the structuring of the surface of the outer wall 10' of the cylindrical body 10 allows the anchoring to be improved and thus the holding in position of the tapped insert in the cylindrical bore to be equipped.

Moreover, in this fourth embodiment, the cylindrical body 10 comprises a tapped inner wall portion 14 at one end of the frusto-conical inner bore, opposite the large base 11a of the frusto-conical inner bore 11.

The cylindrical body 10 thus comprises a tapped inner wall portion 14, defining a cylindrical inner bore portion, joined at the small base 11b to the frusto-conical inner bore 11.

As will be described below, said tapped inner wall 14 advantageously allows the use of an installation and removal tool for such insert to hold the cylindrical body 10 in position in the cylindrical bore to be equipped.

In this embodiment, the core of frusto-conical shape 20 has then a length somewhat lower than the length of the cylindrical body 10 so that it can be accommodated in the part of the frusto-conical inner bore 11 extending beyond the tapped inner wall 14 of the cylindrical body 10.

Now, the installation and removal tool for the tapped insert as illustrated on FIG. 5 will be described in reference to FIG. 6.

This installation and removal tool 50 comprises a cylindrical body 51 comprising at least one threaded end portion 52.

As can be clearly seen on FIG. 6, the thread of this end portion 52 is adapted to the dimensions of the tapping of the tapped inner wall portion 14 of the cylindrical body 10.

It is thus to be noted that the cylindrical body 51 of the installation and removal tool 50 can be screwed into the tapped inner wall portion 14 of the cylindrical body 10 of the tapped insert.

The cylindrical body 51 and its threaded end 52 must of course have a nominal diameter lower than the diameter of the cylindrical bore to be equipped.

The cylindrical body 51 of the installation and removal tool 50 also comprises an inner bore 53 and a screw 55 of diameter substantially lower than the diameter of the inner bore 53 of the cylindrical body 51 of the installation and removal tool 50.

This screw 55 comprises at one end 55a a thread complementary to the tapped inner aperture 21 of the core of frusto-conical shape 20 of the tapped insert.

This screw 55 has a sufficient length to pass through the cylindrical body 51 of the tool and protrude beyond the threaded end portion 52 to be inserted into the tapped inner aperture 21 of the core of frusto-conical shape 20.

Moreover, in this embodiment, and in an in no way limitative manner, a positioning ring 60 is installed so as to slide on the cylindrical body 51 of the tool 50.

Generally, the cylindrical body 51 and the positioning ring 60 comprise complementary sliding means adapted to enable the relative sliding of the positioning ring 60 on the cylindrical body 51 and the maintaining of this positioning ring 60 on the cylindrical body 51 in a defined transverse section of the cylindrical body 51 of the installation and removal tool 50.

In this embodiment, the complementary sliding means are ensured thanks to an external thread on the cylindrical body 51 and a corresponding internal tapping of the positioning ring 60.

Thus, the rotation of the positioning ring 60 around the cylindrical body 51 causes the longitudinal displacement of this positioning ring 60 along the cylindrical body 51 of the installation and removal tool 50.

The existence of the complementary thread between the positioning ring 60 and the cylindrical body 51 automatically enables said positioning ring 60 to be maintained in translation in a defined transverse section of the cylindrical body 51.

Now, the installation of a tapped insert of FIG. 5 thanks to the installation and removal tool 50 described previously will be described in reference to FIGS. 7A to 7E.

The threaded end 52 is installed by screwing into the tapped inner wall portion 14 of the cylindrical body 10 of the tapped insert and the screw 55 of the tool is inserted and partially screwed into the tapped inner aperture 21 of the core of frusto-conical shape 20 placed in the frusto-conical inner bore 11 of the cylindrical body 10 of the tapped insert.

Dimension C, corresponding to the depth by which the tapped insert will be inserted into a cylindrical bore 30 of part A, is then adjusted by moving the positioning ring 60 on the cylindrical body 51 of the tool as illustrated on FIG. 7A.

The adjustment of this dimension C is thus done by screwing or unscrewing the positioning ring 60 on the cylindrical body 51 of the tool 50.

As illustrated on FIG. 7B, the assembly is then inserted into the cylindrical bore 30, the insertion movement being limited by the positioning ring 60 coming into abutment with a front face of part A, with which the cylindrical bore 30 communicates.

The screw 55 of the tool is then screwed into the tapped insert as illustrated on FIG. 7C to exert, as described previously, a traction force on the core of frusto-conical shape 20, according to arrow F, and cause the deformation of the cylindrical body 10 of the tapped insert against the inner walls of the cylindrical bore 30.

The screw 55 is thus tightened according to the torque according to the required anchoring force.

As illustrated on FIG. 7D, the tool is then removed by untightening the screw 55, then unscrewing the body 51 installed at its threaded end 52 into the tapped inner wall portion 14 of the cylindrical body 10.

The tapped insert is then positioned in the cylindrical bore 30 of part A as illustrated on FIG. 7E.

Figure 8A:
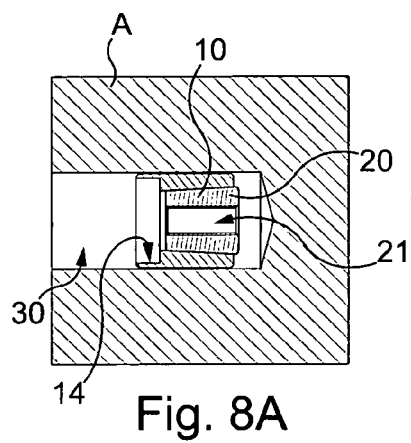

Now, the removal of such insert, from its position in the cylindrical bore 30 as illustrated on FIG. 8A, will be described in reference to FIGS. 8A to 8E.

Figure 8B:
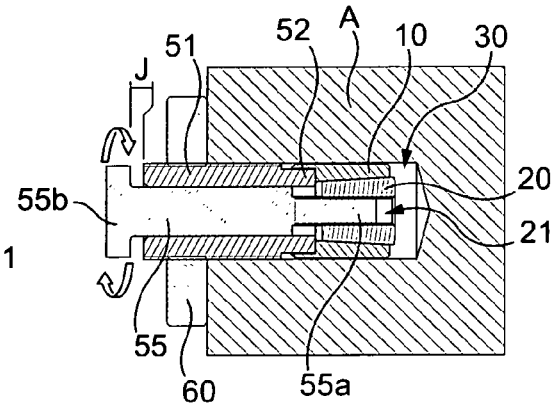

First of all, as illustrated on FIG. 8B, the installation and removal tool 50 is installed by screwing of the threaded end 52 into the tapped inner wall portion 14 of the cylindrical body 10.

The positioning ring 60 is then moved along the cylindrical body 51 of the tool to come into contact with the front face of part A.

The screw 55 is then inserted into the tapped inner bore 21 of the core of frusto-conical shape 20.

This screw 55 is screwed in until a clearance J is left between the head 55b of the screw 55 and the cylindrical body 51 of the installation and removal tool 50.

Figure 8C:
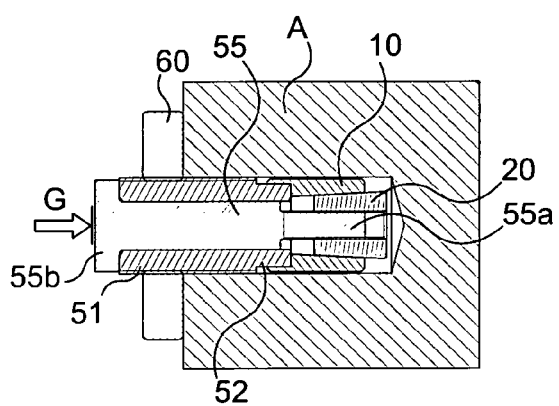

As illustrated on FIG. 8C, by making a light impact in the direction of arrow G against the head 55b of screw 55, the core of frusto-conical shape 20 is moved in translation into the frusto-conical inner bore 11 of the cylindrical body 10 of the tapped insert, in the direction of the large base 11a of said frusto-conical inner bore 11.

The pressure exerted by this insert of frusto-conical shape 20 on the cylindrical body 10 is thus eliminated thanks to the backward movement of the core of frusto-conical shape 20 in the direction (arrow G) of the force exerted on the screw 55.

The installation and removal tool can then be removed with the tapped insert attached to the threaded end 55a of the screw 55.

Figure 8D:
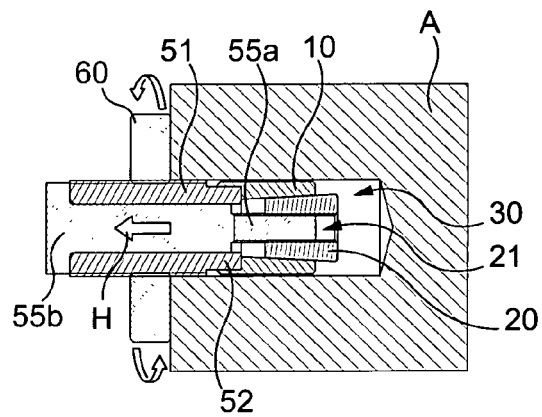

This removal of the tapped insert installed on the screw 55 inserted into the cylindrical body 51 of the tool can also be obtained by screwing the positioning ring 60 against the front face of part A as illustrated on FIG. 8D.

Indeed, the screwing of this positioning ring 60, held in abutment against the front face of the part A, leads to the relative movement, according to arrow H, of the complete cylindrical body 51 of the installation and removal tool 50.

Figure 8E:
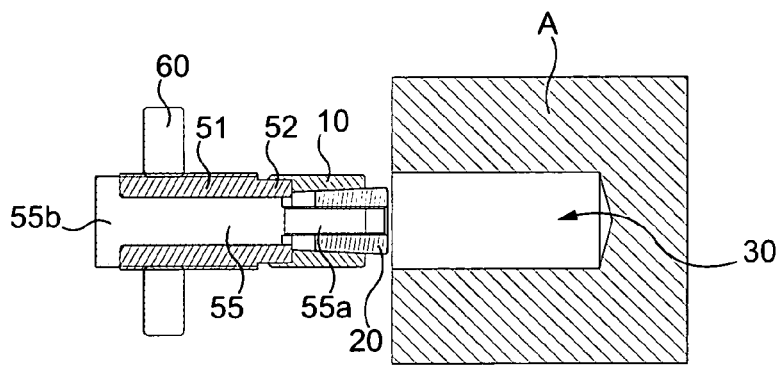

As illustrated on FIG. 8E, we thus obtain the removal of the tapped insert from the cylindrical bore 30 of the part A.

Thus, the positioning and the removal of the tapped insert can be done without damaging the cylindrical bore 30.

The replacement of the tapped insert can thus be easily achieved thanks to the installation and removal tool.

Of course, the present invention is not limited to the embodiment examples described above.

In particular, the various characteristics described in relation to the various embodiments can be combined in a variable manner.

Thus, in particular, the tapped insert with several slots illustrated on FIG. 4 may not have a collar.

Figure 5:
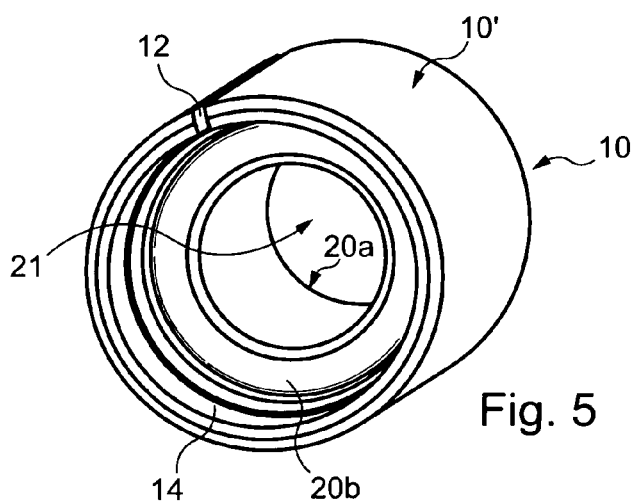
FIG. 5 is a perspective view of a tapped insert according to a fourth embodiment of the invention.

Also, the tapped insert of FIG. 5 usable with the installation and removal tool can have an outer wall with a plain surface.

However, it is to be noted that during the use of an installation and removal tool allowing the tapped insert to be positioned at a determined depth in a cylindrical bore, said tapped insert is not equipped with a collar intended to come into abutment with a front face of the part with the cylindrical bore to be equipped.

The invention claimed is:

1. A tapped insert for a cylindrical bore in a surface of a part, comprising:
    a cylindrical body that includes an inner bore of frusto-conical shape, a threaded inner wall portion adjacent to the frusto-conical inner bore in an axial direction of the cylindrical body, and at least one longitudinal slot extending into the cylindrical body and communicating with said frusto-conical inner bore; and
    a core of frusto-conical shape complementary with said frusto-conical inner bore of the cylindrical body, said core including an inner threaded aperture,
    wherein said cylindrical body and said core are configured such that said tapped insert can be held in position and locked in said cylindrical bore of the part,
    wherein the cylindrical body has a first end configured to be distal from the surface of the part and a second end opposite to the first end in the axial direction of the cylindrical body,
    a diameter of the frusto-conical inner bore increases in a direction from the second end to the first end, and
    a diameter of threaded inner wall portion of the cylindrical body is greater than a diameter of inner threaded aperture of the core.

2. The tapped insert according to claim 1, wherein a value of a half-angle of the core of frusto-conical shape and of the frusto-conical inner bore and a friction coefficient between the cylindrical bore of the part and the cylindrical body are chosen to lock said tapped insert in the cylindrical bore.

3. The tapped insert according to claim 2, wherein the half-angle value of the core of frusto-conical shape is comprised between 2.5° and 5°.

4. The tapped insert according to claim 1, wherein said cylindrical body comprises a collar protruding from an outer wall of said cylindrical body, that is opposite a base of said frusto-conical inner bore of the cylindrical body.

5. The tapped insert according to claim 1, wherein the at least one longitudinal slot includes a plurality of slots that extend over a part of a length of said cylindrical body and communicating with said frusto-conical inner bore.

6. The tapped insert according to claim 4, wherein a surface of the outer wall of said cylindrical body is knurled or striated.

7. The tapped insert according to claim 4, wherein the threaded inner wall portion of the cylindrical body is at one end of said frusto-conical inner bore, opposite the base of said frusto-conical inner bore.

8. The tapped insert according to claim 1, wherein the diameter of the threaded inner wall portion is greater than a largest diameter of the frusto-conical inner bore.

9. The tapped insert according to claim 1, wherein the threaded inner wall portion adjacent of the body is at the second end.

\* \* \* \* \*